United States Patent
Madasamy

(10) Patent No.: US 9,755,786 B2
(45) Date of Patent: Sep. 5, 2017

(54) METHOD OF MESSAGE RETRANSMISSION AND USER EQUIPMENT USING THE SAME

(71) Applicant: Acer Incorporated, New Taipei (TW)

(72) Inventor: Sathiyakeerthi Madasamy, New Taipei (TW)

(73) Assignee: Acer Incorporated, New Taipei (TW)

( * ) Notice: Subject to any disclaimer, the term of this patent is extended or adjusted under 35 U.S.C. 154(b) by 127 days.

(21) Appl. No.: 14/723,480

(22) Filed: May 28, 2015

(65) Prior Publication Data

US 2016/0112160 A1   Apr. 21, 2016

Related U.S. Application Data

(60) Provisional application No. 62/065,010, filed on Oct. 17, 2014.

(30) Foreign Application Priority Data

Jan. 29, 2015   (TW) .............................. 104103010 A

(51) Int. Cl.
*H04L 1/08* (2006.01)
*H04W 8/00* (2009.01)
(Continued)

(52) U.S. Cl.
CPC ................ *H04L 1/08* (2013.01); *H04L 67/16* (2013.01); *H04L 69/28* (2013.01); *H04W 8/005* (2013.01); *H04W 12/08* (2013.01)

(58) Field of Classification Search
CPC ........... H04L 1/08; H04L 69/28; H04L 67/16; H04W 8/005; H04W 12/06; H04W 12/08
See application file for complete search history.

(56) References Cited

U.S. PATENT DOCUMENTS

2011/0191473 A1   8/2011   Sakai et al.
2012/0163161 A1*  6/2012   Zhang .................. H04L 1/1874
                                                      370/216
(Continued)

FOREIGN PATENT DOCUMENTS

TW   200743326   11/2007
TW   200849880   12/2008
(Continued)

OTHER PUBLICATIONS

3GPP TS 24.334 V12.0.0, Sep. 2014.*

*Primary Examiner* — Habte Mered

(74) *Attorney, Agent, or Firm* — Jianq Chyun IP Office

(57) ABSTRACT

A method of message retransmission and a user equipment (UE) using the same are provided, which are adapted for performing a discovery procedure of the proximity service (ProSe). The UE includes a transceiver and a processor. The transceiver is used to transmit and receive a wireless signal. The processor is coupled to the transceiver and configured to perform the following steps. A first message used for an authorization request of the ProSe is transmitted through the transceiver, and a first timer is started. If a second message responding to the first message is not received through the transceiver when the first timer is expired, a second timer is started. And, the first message is not transmitted through the transceiver before the second timer is expired.

10 Claims, 4 Drawing Sheets

(51) Int. Cl.
*H04L 29/06* (2006.01)
*H04W 12/08* (2009.01)
*H04L 29/08* (2006.01)

(56) References Cited

U.S. PATENT DOCUMENTS

2014/0141777 A1   5/2014   Guo
2014/0295868 A1   10/2014  Lee

FOREIGN PATENT DOCUMENTS

TW   201043308   12/2010
TW   201427345    7/2014
WO   2012146292  11/2012

\* cited by examiner

METHOD OF MESSAGE RETRANSMISSION AND USER EQUIPMENT USING THE SAME

CROSS-REFERENCE TO RELATED APPLICATION

This application claims the priority benefits of U.S. provisional application Ser. No. 62/065,010, filed on Oct. 17, 2014 and Taiwan application serial no. 104103010, filed on Jan. 29, 2015. The entirety of each of the above-mentioned patent applications is hereby incorporated by reference herein and made a part of this specification.

BACKGROUND OF THE INVENTION

Field of the Invention

The invention relates to a proximity service (ProSe) technique, and more particularly, to a method of message retransmission for a discovery procedure of the proximity service and a user equipment using the same.

Description of Related Art

In recent years, with rapid development in mobile communication technologies and smart handheld devices, global mobile broadband users and mobile data traffics both show an exponential growth. However, the exploding amounts of mobile broadband users and data traffics lead to issues regarding spectral efficiency, frequency utilization and network coverage of mobile communication network. Accordingly, in next generation wireless communication technologies (e.g., 4G, 5G) of Third Generation Partnership Project (3GPP), solutions and technical discussions have been proposed specifically for aforementioned issues. As a result, a device-to-device (D2D) communication technology has become one of focused technologies in development.

In a traditional mobile communication network, a user equipment (UE) such as a smart phone, a tablet computer and the like needs to transmit voice or data signals through a core network. The D2D technology brings innovative business value to telecommunication operators by forwarding data through use of proximity device discovery and direct communication instead of going through the core network thereby achieving effectiveness of offload, Location-Based Service (LBS) and the like.

SUMMARY OF THE INVENTION

The invention is directed to a method of message retransmission and a user equipment using the same, which are capable of starting an additional timer during a discovery procedure of the ProSe without retransmitting the message before said timer is expired, so as to avoid retransmitting the message for too many times.

The invention proposes a method of message retransmission, which is adapted to a user equipment for performing a discovery procedure of the ProSe, and the method includes the following steps. A first timer is started in response to transmitting a first message used for an authorization request of the ProSe. A second timer is started if a second message responding to the first message is not received when the first timer is expired. Herein, the first message is not transmitted before the second timer is expired.

The invention provides a user equipment, which is adapted for performing a discovery procedure of the ProSe. The UE includes a transceiver and a processor. The transceiver is used to transmit and receive a wireless signal. The processor is coupled to the transceiver and configured to perform the following steps. A first message used for an authorization request of the ProSe is transmitted through the transceiver, and a first timer is started. If a second message responding to the first message is not received through the transceiver when the first timer is expired, a second timer is started. And, the first message is not transmitted through the transceiver before the second timer is expired.

Based on the above, if the second message responding to the first message is not received when the first timer is expired, the processor according to the embodiments of the invention starts the second timer and does not retransmit the first message until the second timer is expired. Accordingly, the user equipment may reduce a number of times for the retransmission within a unit of time, so as to reduce the power consumption of the user equipment and reduce the network loading.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
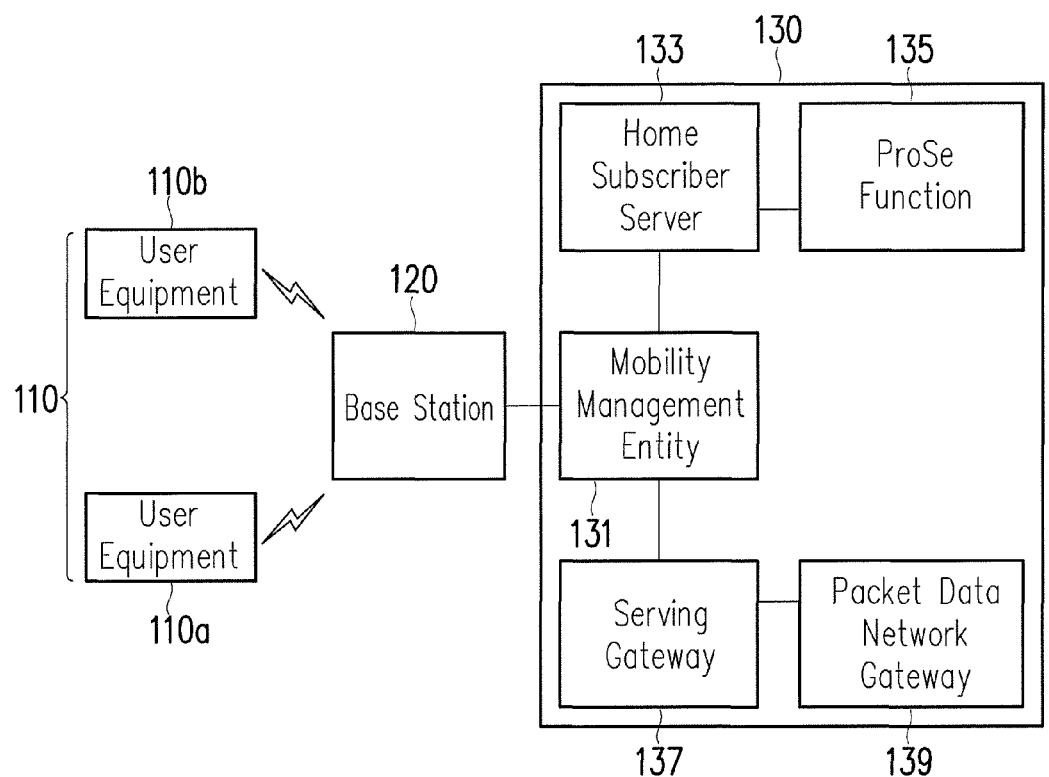
FIG. 1 is a schematic diagram illustrating a communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In a wireless communication protocol, a common hand shaking procedure refers to a situation where a user equipment transmits a service request to a service provider and the service provider responds to such service request. If a respond for the service request is not received by the user equipment, the service request is usually retransmitted again. Accordingly, in order to reduce a power consumption of the user equipment and reduce a signaling traffic loading, during a discovery procedure (e.g., an announce request procedure) of the proximity service (ProSe), two timers are proposed according to the embodiments of the invention. In the invention, a first timer is started in response to transmitting a first message (e.g., DISCOVERY_REQUEST) used for an authorization request of the ProSe, whereas a second timer is started in response to a case where a response to the first message (e.g., DISCOVERY_RESPONSE) is still not received when the first timer is expired. Further, the first message is not retransmitted before the second timer is expired. In this way, the user equipment may reduce a number of times for retransmitting the first message so as to reduce the power consumption and the signaling traffic loading. Reference will now be made to the present preferred embodiments of the invention, and it will be apparent to those skilled in the art that adjustments and applications can be correspondingly made to the following embodiments based on demands instead of being limited by the content in the following description.

FIG. 1 is a schematic diagram illustrating a communication system according to an embodiment of the invention. Referring to FIG. 1, a communication system 100 includes a user equipment 110, a base station 120 and a core network 130. It should be noted that, although FIG. 1 illustrates two user equipments 110a, 100b and a base station 120 as an example, the invention is not limited thereto.

The user equipment 110 may be presented as various implementations, which may (but not limited to) include, for example, a mobile station, an advanced mobile station (AMS), a server, a user terminal, a desktop computer, a notebook computer, a network computer, a workstation, a personal digital assistant (PDA), a personal computer (PC), a scanner, a phone device, a pager, a camera, a television, a handheld video game device, a music device, a wireless sensor, etc.

Figure 2:
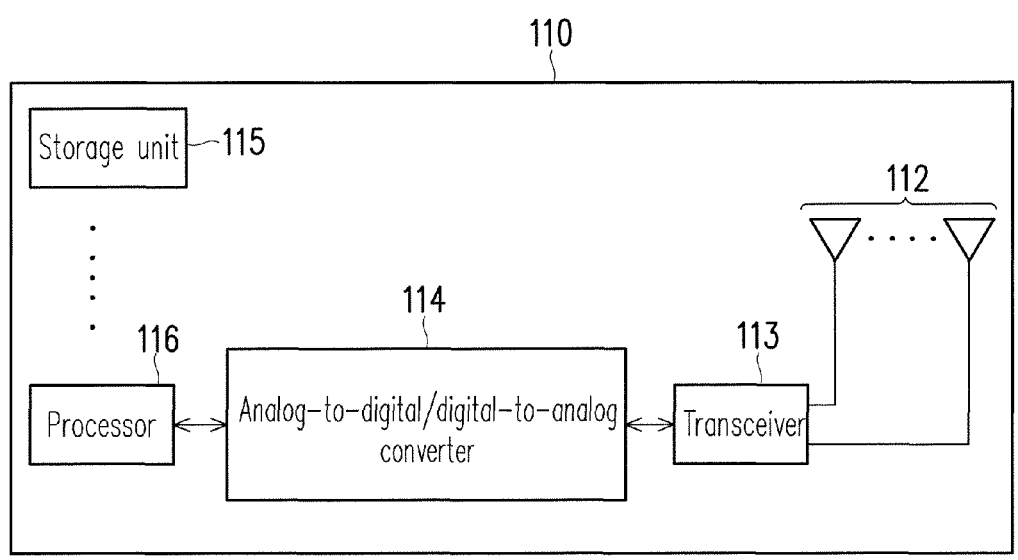
FIG. 2 is a block diagram illustrating the user equipment according to an embodiment of the invention.

FIG. 2 is a block diagram illustrating the user equipment 110 according to an embodiment of the invention, and the user equipment 110 may at least be represented by function devices illustrated in FIG. 2. The user equipment 110 may at least (but not limited to) include a transceiver 113, an analog-to-digital (A/D)/digital-to-analog (D/A) converter 114, a processor 116, a storage unit 115 that is optionally selected and one or more antenna units 112. The transceiver 113 transmits a downlink signal and receives an uplink signal in a wireless manner. The transceiver 113 may also execute operations such as low noise amplifying, impedance matching, frequency mixing, frequency upconversion or downconversion, filtering, amplification and the like. The analog-to-digital (A/D)/digital-to-analog (D/A) converter 114 is configured to convert an analog signal format into a digital signal format during a processing period for the uplink signal, and convert the digital signal format into the analog signal format during a processing period for the downlink signal.

The processor 116 is configured to process the digital signal and execute procedures according to the exemplary embodiments of the invention (such as the discovery procedure of the ProSe). In addition, the processor 116 may be optionally coupled to the storage unit 115, so as to store a programming code, a device configuration, a codebook, buffer or permanent data and record a plurality of modules executed by the processor 116. Functions of the processor 116 may be implemented by using programmable units such as a microprocessor, a microcontroller, a digital signal processing (DSP) chip, a field programmable gate array (FPGA) and the like. The functions of the processor 116 may also be implemented by an independent electronic device or integrated circuit (IC), and the processor 116 may be implemented in form of hardware or software.

Further, the user equipment 110 according to embodiments of the invention may also be a ProSe-enabled electronic device. That is to say, the user equipment 110 may perform functions such as exchanging the ProSe control information, starting the ProSe Direct Discovery procedure with other ProSe-enabled electronic devices, performing the ProSe direct communication and so on.

The base station 120 may be presented as various implementations, which may (but not limited to) include, for example, an evolved node B (eNB), a home evolved node B (HeNB), an advanced base station (ABS), a base transceiver system (BTS), an access point, a home base station, a relay, a scatterer, a repeater, an intermediate node, an intermediary and/or a satellite-based communication base station.

The core network 130 may be an evolved packet core (EPC) network or a core network of 3G, 4G and even 5G communication technologies. The core network 130 may at least (but not limited to) include a mobility management entity (MME) 131, a home subscriber server (HSS) 133, a ProSe function 135, a serving gateway (S-GW) 137 and a packet data network gateway (PDN-GW) 139.

Figure 3:
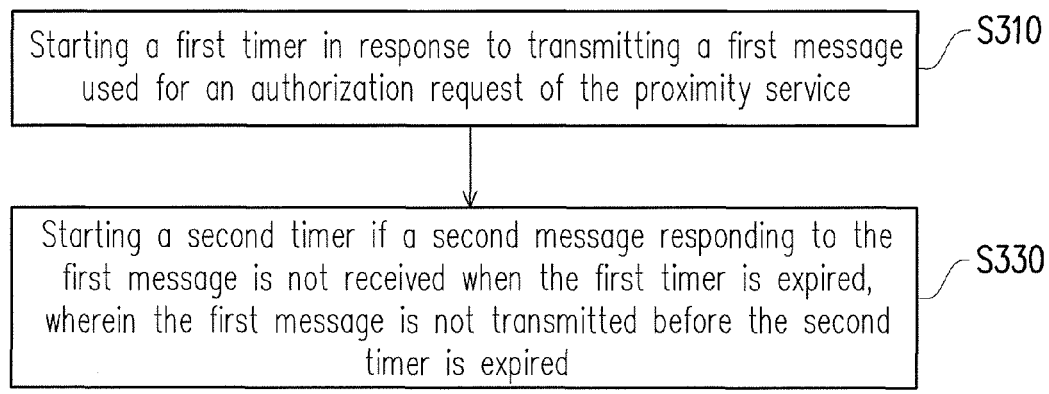
FIG. 3 is a flowchart illustrating a method of message retransmission according to an embodiment of the invention.

FIG. 3 is a flowchart illustrating a method of message retransmission according to an embodiment of the invention. Referring to FIG. 3, the method of the present embodiment is adapted for the communication system 100 of FIG. 1 and the user equipment 110 of FIG. 2. Hereinafter, the method according to the embodiments of the invention is described below by reference with various elements in the communication system 100 and the user equipment 110. Each step in the playing method may be adjusted based on actual conditions, and the invention is not limited thereto.

In step S310, the processor 116 transmits a first message used for an authorization request of the proximity service through the transceiver 113, and starts a first timer. Specifically, during the ProSe Direct Discovery, after a request for announce from an upper layer (e.g., the ProSe application) is received by the user equipment 110, the announce request procedure is performed to obtain the ProSe Application Code used on an interface between each of the other ProSe-enabled user equipments (e.g., a PC5 interface between the user equipments 110a and 110b). At the time, the user equipment 110 transmits the first message such as DISCOVERY_REQUEST to the ProSe function 135 (e.g., through a PC3 interface) so as to obtain an authorization for registration on the Public Land Mobile Network (PLMN). Herein, the first message includes, for example, data such as the ProSe Application identification (ID), the transaction ID, a command for setting "announce" and a UE identity.

Further, as in response to transmission of the first message, the processor 116 starts the first timer (e.g., T3901). A timing value of said timer is, for example, 30 seconds, 40 seconds or 60 seconds.

It should be noted that, a signaling path between user equipment 110 and the ProSe function 135 may pass through one or more network entities (e.g., MME 131, HSS 133, etc.), but the embodiments of the invention are not limited by aforesaid transmission path or method.

Subsequently, in step S330, if a second message responding to the first message is still not received through the transceiver 113 when the first timer is expired, a second timer is started by the processor 116. And, the first message is not retransmitted through the transceiver 113 before the second timer is expired. Specifically, the reasons why the user equipment 110 fails to receive the second message (e.g., DISCOVERY_RESPONSE) responding to the first message may include a problem where a network between the base station 120 and the core network 130 fails or a problem where a connection with the user equipment 110 fails. Because said problems regarding the network and the connection may not be recovered immediately, even if the first message is retransmitted immediately when the first timer is expired, it is possible that the second message is still not be received before the first timer is expired. The first message being constantly retransmitted within a short period of time could lead to abnormal power consumption for a battery and increases in the signaling traffic loading. Accordingly, in the embodiments of the invention, a second timer (e.g., T3902) is additionally started so that the user equipment does not transmit the first message before the second timer is expired.

In an embodiment, the user equipment 110 may transmit the first message through the transceiver 113 to re-initialize the announce request procedure and then restart the first timer only after the network or the connection are recovered and the second timer is expired.

In another embodiment, before the second timer is expired, the processor 116 further closes an existing secure connection to the ProSe function 135 through the transceiver 113. As such, during this period of time, the transceiver 113 does not receive nor respond to the second message responded from the ProSe function 135. When the second timer is expired, the processor 116 may re-establish a new secure connection to the ProSe function 135 through the transceiver 113 in order to retransmit the first message.

In some other embodiments, the processor 116 further multiplies a timing value of the second timer by a multiple value (e.g., 2, 3, 5, etc.). It is possible that the network or the connection is still not recovered even after both the first timer and the second timer are expired. In such scenario, the user equipment 110 is still unable to receive the second message. Accordingly, when the next time the first timer is expired, the processor 116 may extend the timing value of the second timer by the multiple value so that the user equipment 110 may extend its waiting time for the problems to be solved. In some embodiments, the second timer further includes a timing maximum value (e.g., 30 minutes, 40 minutes, etc.). If the timing value of the second timer is greater than the timing maximum value, the processor 116 sets the timing value of the second timer to be the timing maximum value.

For instance, in the case where an initial timing values of the first timer and the second timer are set to 1 minute and the second message is still not received by the user equipment 110 when the first time is expired for the second time, the processor 116 may set the timing value of the second timer to 2 minutes and starts the second timer. An expiration time of the second timer may adopt in the same manner as the above when the first timer is expired for the third time, the fourth time and so forth. Assuming that the timing maximum value is 30 minutes, if the timing value of the second timer is also 30 minutes, the processor 116 may still set the timing value of the second timer to be 30 minutes when the next time the first timer is expired. Accordingly, not only is the waiting time extended, inconvenience caused by the waiting time being awfully long to a user may also be prevented.

It should be noted that, in other embodiments, if the user equipment 110 receives the second message after the first timer is started and before the first timer is expired, the processor 116 will stop the first timer. Also, the processor 116 will not start the second timer.

To facilitate in understanding more of the steps in the foregoing embodiments, an example is provided below to describe the announce request procedure between the user equipment 110 and the ProSe function 135.

Figure 4:
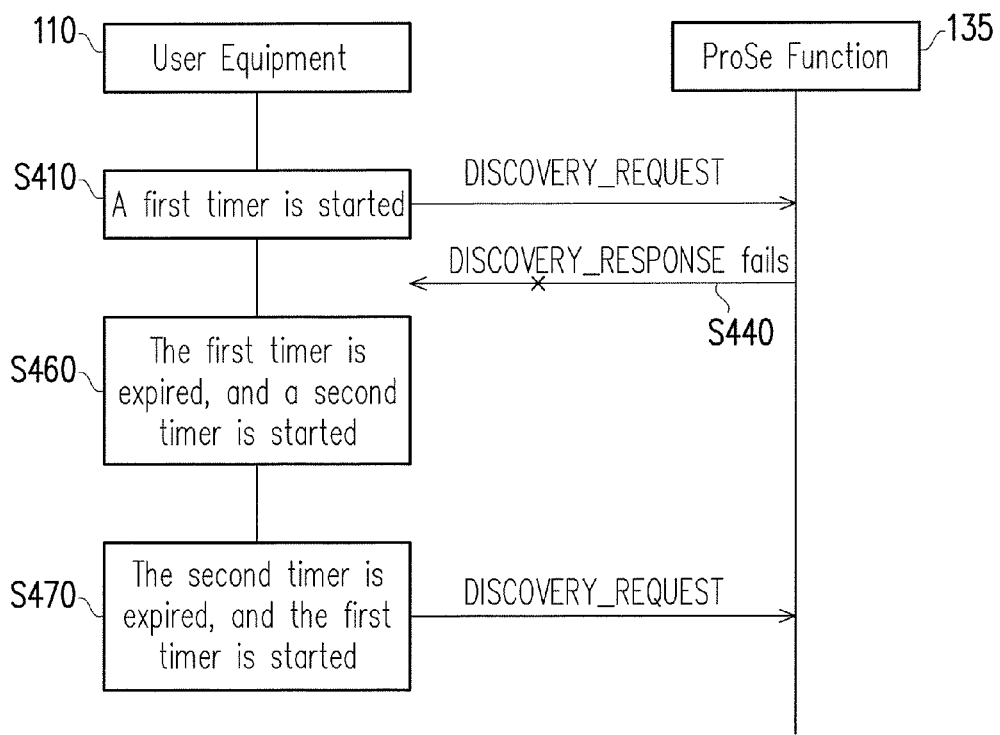
FIG. 4 is a flowchart illustrating an interaction between the user equipment and the proximity service function in the announce request procedure according to an embodiment of the invention.

FIG. 4 is a flowchart illustrating an interaction between the user equipment 110 and the ProSe function 135 in the announce request procedure according to an embodiment of the invention. Referring to FIG. 4, in step S410, the user equipment 110 starts the first timer and transmits DISCOVERY_REQUEST to the ProSe function 135. Herein, it is assumed that the timing value of the first timer is 30 seconds. If a transmission of DISCOVERY_ REQUEST from the ProSe function 135 fails (step S440), the ProSe function 135 cannot receive DISCOVERY_REQUEST or the ProSe function 135 cannot transmit DISCOVERY_RESPONSE, after waited until the first timer is expired, the processor 116 starts the second time (step S460) but does not transmit DISCOVERY_REQUEST through the transceiver 113. Herein, it is assumed that the timing value of the second timer is 1 minute. After waited until the second timer is expired (i.e., after 1 minute), the processor 116 starts the first timer again and transmits DISCOVERY_ REQUEST through the transceiver 113 (step S470).

In the invention, 3GPP-like keywords or phrases are used merely as examples to present inventive concepts in accordance with the present disclosure; however, the same concept presented in the invention can be applied to any other systems such as IEEE 802.11, IEEE 802.16, WiMAX and the like by persons skilled in the art.

In summary, besides that the first timer is started when the authorization request for the ProSe is transmitted, the user equipment according to the embodiments of the invention also starts the second timer when the first timer is expired, but does not retransmit the first message before the second timer is expired. As a result, the power consumption of the battery of the user equipment may be effectively reduced while reducing the network traffic loading.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of message retransmission, adapted to a user equipment for performing a discovery procedure of a proximity service (ProSe), and the method comprising:
   starting a first timer in response to transmitting a first message used for an authorization request of the ProSe; and
   starting a second timer if a second message responding to the first message is not received when the first timer is expired, wherein
   the first message is not retransmitted before the second timer is expired, and retransmitting the first message after the second timer is expired.

2. The method according to claim 1, wherein after the step of starting the second timer, the method further comprises:
   retransmitting the first message and starting the first timer when the second timer is expired.

3. The method according to claim 2, wherein after the step of transmitting the first message and starting the first timer, the method further comprises:
   multiplying a timing value of the second timer by a multiple value.

4. The method of claim 3, further comprising:
   setting the timing value of the second timer to be a timing maximum value if the timing value of the second timer is greater than the timing maximum value.

5. The method according to claim 1, wherein when the first timer is expired, the method further comprising:
   closing a secure connection to a ProSe function.

6. A user equipment, adapted for performing a discovery procedure of a proximity service (ProSe), and the user equipment comprising:
   a transceiver, used to transmit and receive a wireless signal;

a processor, coupled to the transceiver, and the processor is configured to perform steps of:

transmitting a first message used for an authorization request of the ProSe through the transceiver, and starting a first timer; and starting a second timer if a second message responding to the first message is not received through transceiver when the first timer is expired, wherein the first message is not retransmitted through the transceiver before the second timer is expired, and retransmitting the first message after the second timer is expired.

7. The user equipment according to claim 6, wherein when the second timer is expired, the first message is retransmitted through the transceiver and the first timer is started by the processor.

8. The user equipment according to claim 7, wherein the processor multiplies a timing value of the second timer by a multiple value.

9. The user equipment according to claim 8, wherein if the timing value of the second timer is greater than a timing maximum value, the processor sets the timing value of the second timer to be the timing maximum value.

10. The user equipment according to claim 6, wherein the processor closes a secure connection to a ProSe function through the transceiver.

\* \* \* \* \*